(12) United States Patent
Chalmers et al.

(10) Patent No.: US 12,078,571 B1
(45) Date of Patent: Sep. 3, 2024

(54) SYSTEM AND METHOD FOR ROOF LEAK DETECTION AND DIAGNOSIS

(71) Applicant: United Services Automobile Association (USAA), San Antonio, TX (US)

(72) Inventors: Timothy Blair Chalmers, San Antonio, TX (US); Ramsey Devereaux, San Antonio, TX (US); Dwayne Phillip Wilson, Crossroads, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 186 days.

(21) Appl. No.: 17/585,746

(22) Filed: Jan. 27, 2022

Related U.S. Application Data

(60) Provisional application No. 63/142,063, filed on Jan. 27, 2021.

(51) Int. Cl.
*G01M 3/04* (2006.01)
*G01N 21/88* (2006.01)

(52) U.S. Cl.
CPC .............. *G01M 3/04* (2013.01); *G01N 21/88* (2013.01); *G01N 2201/06113* (2013.01)

(58) Field of Classification Search
CPC .......... G01M 3/04; G01M 3/16; G01N 21/88; G01N 2201/06113; E04B 7/00
See application file for complete search history.

(56) References Cited

U.S. PATENT DOCUMENTS

| 10,042,341 B1 * | 8/2018 | Jacob .................. H04L 12/2818 |
| 2011/0194102 A1 * | 8/2011 | Richardson ........... G01M 3/047 |
| | | 356/73.1 |

\* cited by examiner

*Primary Examiner* — Benjamin R Schmitt
(74) *Attorney, Agent, or Firm* — Fletcher Yoder, PC

(57) ABSTRACT

A roof monitoring system includes sensors configured to be distributed across a roof a building. The monitoring system also includes a controller configured to receive sensor feedback from the sensors, where the sensor feedback is indicative of a roof temperature, a first characteristic of light reflected off the roof, a second characteristic of light passing through the roof, a third characteristic of sound associated with the roof, and/or a moisture content on the roof. The controller is also configured to compare the sensor feedback with an expected feedback. The controller is also configured to detect, in response to determining that the sensor feedback deviates from the expected feedback, a roof defect. The controller is also configured to diagnose a cause of the roof defect.

20 Claims, 4 Drawing Sheets

SYSTEM AND METHOD FOR ROOF LEAK DETECTION AND DIAGNOSIS

CROSS-REFERENCE TO RELATED APPLICATION

This application claims priority to and the benefit of U.S. Provisional Application No. 63/142,063, entitled "SYSTEM AND METHOD FOR ROOF LEAK DETECTION AND DIAGNOSIS," filed Jan. 27, 2021, which is herein incorporated by reference in its entirety.

BACKGROUND

The present disclosure relates generally to detecting and diagnosing roof defects. More particularly, the present disclosure relates to monitoring sensor feedback to detect and diagnose roof defects.

In traditional embodiments, a roof for a building may be inspected at various time intervals (e.g., seasonally, every month, every half-year, every year, every two years, every five years) to ensure that a quality of the roof is maintained. For example, a technician may manually observe and/or test various areas of the roof to determine whether a defect, such as a hole or a leak, is present. However, traditional manual inspection may be inaccurate and/or under informative. Further, roof defects may be present at times other than scheduled maintenance intervals. While roof defects may also be detected when perceived by occupants of the building, a source, cause, extent, and/or duration of the defect may be difficult or impossible to readily ascertain. Thus, improved roof monitoring and maintenance are desired.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a roof monitoring system includes sensors configured to be distributed across a roof a building. The monitoring system also includes a controller configured to receive sensor feedback from the sensors, where the sensor feedback is indicative of a roof temperature, a first characteristic of light reflected off the roof, a second characteristic of light passing through the roof, a third characteristic of sound associated with the roof, a moisture content on the roof, or any combination thereof. The controller is also configured to compare the sensor feedback with an expected feedback. The controller is also configured to detect, in response to determining that the sensor feedback deviates from the expected feedback, a roof defect. The controller is also configured to diagnose a cause of the roof defect.

In an embodiment, a computer-implemented method includes detecting, via a sensor assembly, a characteristic associated with a roof. The method also includes receiving, at a controller and from the sensor assembly, sensor feedback indicative of the characteristic associated with the roof. The method also includes determining, via the controller and based on the sensor feedback, that the characteristic associated with the roof deviates from a reference characteristic associated with the roof. The method also includes determining, via the controller, a roof defect of the roof in response to determining that the characteristic associated with the roof deviates from the reference characteristic associated with the roof. The method also includes diagnosing, via the controller, a cause of the roof defect.

In an embodiment, one or more non-transitory, computer-readable media includes instructions stored thereon that, when executed by one or more processors, are configured to cause the one or more processors to receive, from a sensor assembly, sensor feedback indicative of a characteristic associated with a roof. The instructions are also configured to cause the one or more processors to compare, based on the sensor feedback, the characteristic associated with the roof with an expected characteristic associated with the roof. The instructions are also configured to cause the one or more processors to determine, based on the characteristic associated with the roof deviating from the expected characteristic associated with the roof, a presence of a defect of the roof. The instructions are also configured to cause the one or more processors to diagnose a cause of the defect of the roof.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
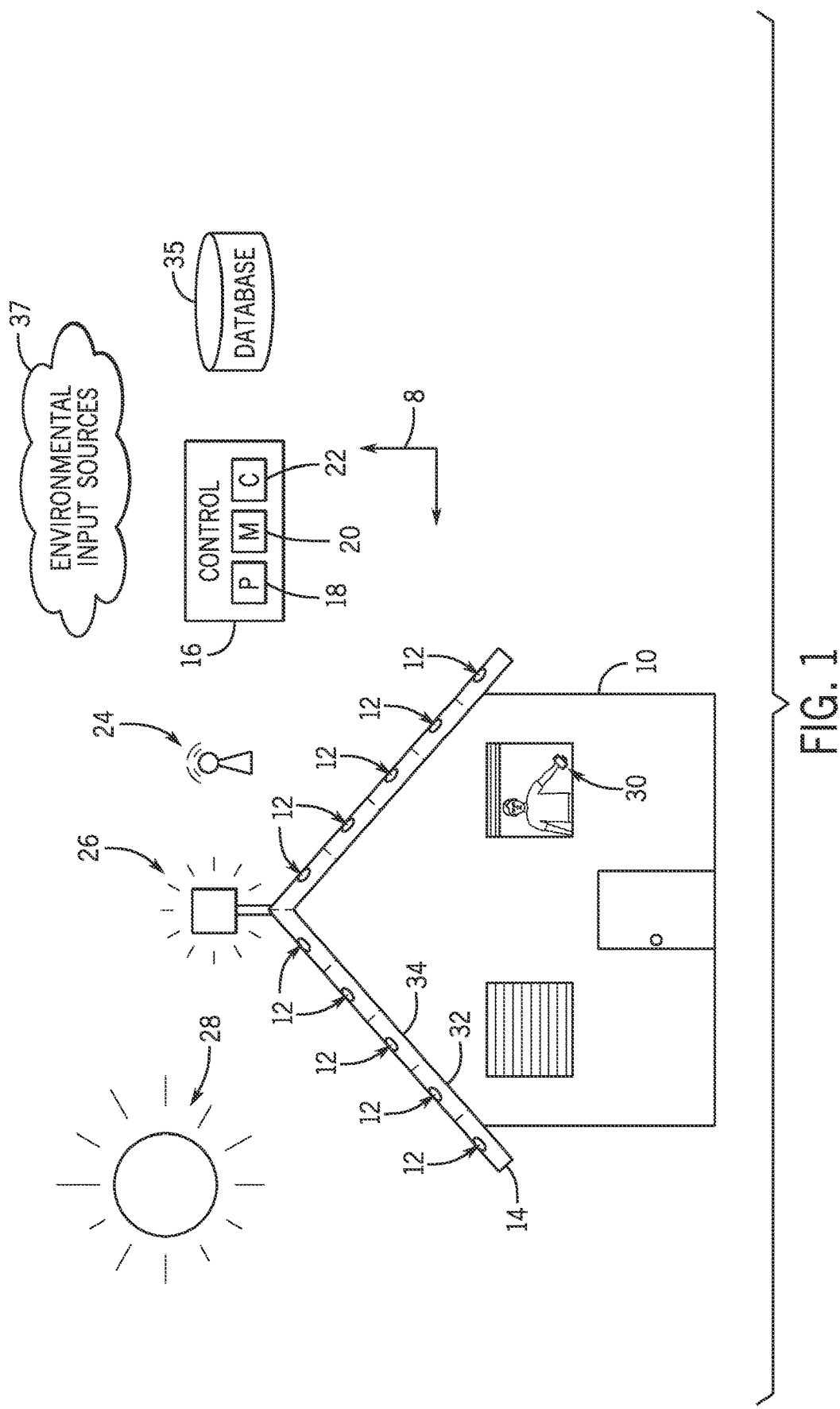
FIG. 1 is a schematic illustration of a system for monitoring a roof of a building, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally toward detecting and diagnosing roof defects, such as holes and leaks, and more particularly to monitoring sensor feedback to detect and diagnose the roof defects. In traditional embodiments, a roof for a building may be inspected at various time intervals (e.g., seasonally, every month, every half-year, every year, every two years, every five years) to ensure that a quality of the roof is maintained. However, roof defects may be present at times other than scheduled maintenance intervals. Further, traditional manual inspection may be inaccurate and/or under informative.

Presently disclosed embodiments include a monitoring system having an array of sensors and a controller communicatively coupled with the array of sensors. The array of sensors includes at least a first type of sensor, but may also include a second type of sensor, a third type of sensor, a fourth type of sensor, a fifth type of sensor, and so on and so forth. For example, the first type of sensor may include a temperature sensor, the second type of sensor may include a laser light sensor, the third type of sensor may be a daylight sensor, the fourth type of sensor may include a sound or vibration sensor, the fifth type of sensor may include a moisture sensor, and so on and so forth.

The controller may include a processor and a memory storing instructions thereon that, when executed by the processor, cause the processor to perform various acts or functions. For example, the processor may be configured to receive sensor feedback from the array of sensors described above. That is, the processor may receive sensor feedback indicative of temperatures of various portions of the roof, characteristics of light (e.g., laser light) reflected off the roof (e.g., a presence or intensity of light), characteristics of light (e.g., daylight) passing through various portions of the roof (e.g., a presence or intensity of light), characteristics of sound or vibrations occurring at various portions of the roof (e.g., a presence, intensity, frequency, amplitude, wavelength, wave period, etc. of the sound or vibrations), moisture detected at various portions of the roof, and/or other parameters associated with the roof.

The controller is configured to detect and diagnose roof defects based on the sensor feedback noted above. In general, the controller may determine a roof defect or likely roof defect by ascertaining that the sensor feedback deviates from expected sensor feedback. For example, if the sensor feedback relates to temperature, the controller may determine, based on the temperature feedback, certain temperatures or temperature differentials that may be indicative of a roof defect. Indeed, a detected temperature at a particular portion of the roof may indicate a water leak if the detected temperature substantially deviates from a reference temperature developed (e.g., via a baselining procedure) for the particular portion of the roof at issue. Additionally or alternatively, a temperature differential between a first detected temperature at a first portion of the roof and a second detected temperature at a second portion of the roof may indicate a water leak if the temperature differential substantially deviates from an expected temperature differential. Other temperature comparisons in accordance with the present disclosure are also possible. As noted above, the expected temperature and/or temperature differentials may be preliminarily developed by the controller over time via a baselining procedure associated with the roof at issue. For example, the sensors may be installed on the roof when it is known that the roof is not defective, and sensor readings may be recorded over a baselining period of time that may, in some embodiments, take into account various daily, seasonal, and weather changes. Over time, the sensor readings recorded during the baselining period of time can be utilized by the controller to develop the expected sensor readings after the baselining period of time. Sensor feedback relating to laser light, daylight, sound or vibration, moisture, and/or other parameters may be additionally or alternatively processed in various ways to detect and diagnose various types of roof defects, such as water leaks, roof holes, roof drain blockages, animal ingress/egress, and the like. Detailed description of the above-described sensor feedback and data processing will be provided below with reference to the drawings.

Figure 2:
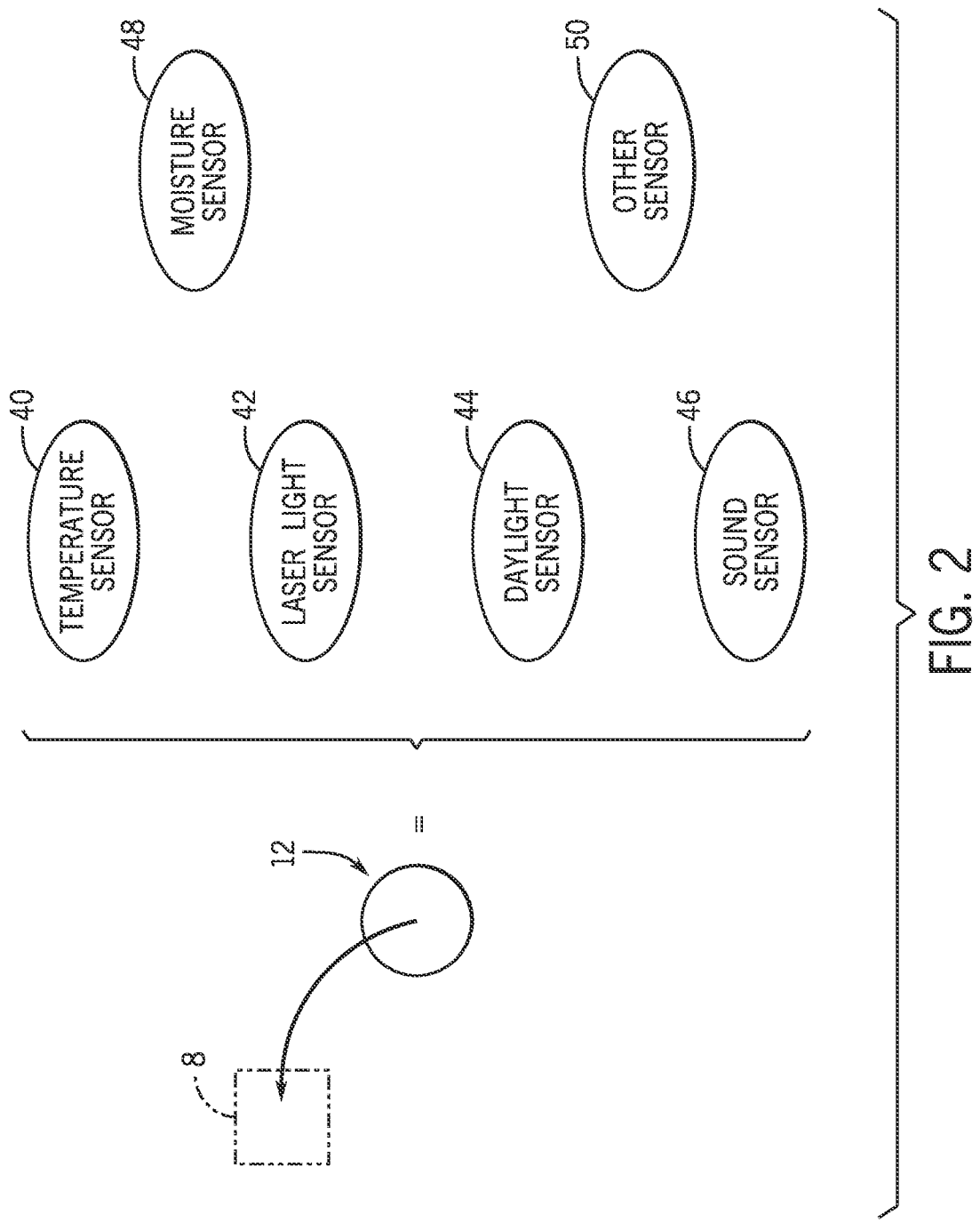
FIG. 2 illustrates a portion of the system of FIG. 1, the portion having at least one type of sensor, in accordance with embodiments described herein.

Turning now to the drawings, FIG. 1 is a schematic illustration of an embodiment of a system 8 for monitoring a roof 14 of a building 10. In the illustrated embodiment, the system 8 includes a number of sensors 12 disposed in, on, or adjacent to the roof 14 and configured to monitor various parameters associated with the roof, such as temperature, light, sound, and/or moisture in and around the roof 14. Indeed, as illustrated in FIG. 2, the sensors 12 may include temperature sensors 40, laser light sensors 42, daylight sensors 44, sound sensors 46, moisture sensors 48, or other sensors 50. It should be noted that, in some embodiments, all the sensors 12 illustrated in FIG. 1 may be of the same type, while in other embodiments, the sensors 12 illustrated in FIG. 1 may include a number of different types. For example, in one embodiment, the temperature sensor 40 in FIG. 2 is included for all the sensors 12 illustrated in FIG. 1. In another embodiment, the temperature sensor 40 in FIG. 2 is included for a portion of the sensors 12 illustrated in FIG. 1 and the laser light sensor 42 in FIG. 2 is included for an additional portion of the sensors 12 illustrated in FIG. 1. Any combination is possible in accordance with the present disclosure. For example, the sensors 12 of FIG. 1 may include only one type of the sensors 40, 42, 44, 46, 48, 50 illustrated in FIG. 2, or two types of the sensors 40, 42, 44, 46, 48, 50 illustrated in FIG. 2, or three types of the sensors 40, 42, 44, 46, 48, 50 illustrated in FIG. 2, or four types of the sensors 40, 42, 44, 46, 48, 50 illustrated in FIG. 2, or five types of the sensors 40, 42, 44, 46, 48, 50 illustrated in FIG. 2, or six types of the sensors 40, 42, 44, 46, 48, 50 illustrated in FIG. 2. While some sensors may be multifunctional, such sensors may also be considered separate sensors in accordance with the present disclosure. For example, even if a single sensor housing includes features for detecting temperature and pressure (e.g., barometric pressure), such a sensor may be referred to as a temperature sensor and separately as a pressure sensor.

Focusing again on FIG. 1, the illustrated system 8 also includes a controller 16 having a processor 18, a memory 20, and communication circuitry 22. The memory 20 stores instructions thereon that, when executed by processing circuitry of the processor 18, cause the controller 16 (or processor 18 thereof) to perform various acts or functions. For example, the controller 16 may receive sensor feedback from the various sensors 12 installed on the roof 14 of the building 10. The sensor feedback may be communicated via wired connections or wireless connections (e.g., by way of a wireless communication system or protocol 24, such as Bluetooth, the internet, etc.) between the sensors 12 and the controller 16. As previously described, the sensors 12 may be configured to detect one or more parameters associated with the roof 14, such as temperatures at various portions of the roof 14, laser light or daylight reflected off or passing through various portions of the roof 14, sound or vibrations detected at various portions of the roof 14, moisture detected at various portions of the roof 14, and so on and so forth.

The controller 16 may detect and diagnose, based on the sensor feedback received from the various sensors 12, a roof defect (e.g., a roof hole or water leak) associated with the roof 14. For example, the controller 16 may determine the existence (or likely existence) of a roof defect by determining that the sensor feedback received by the controller 16 deviates from expected feedback in some way. In one embodiment, the controller 16 may determine that a detected temperature, or a differential between two temperatures, is unexpected and indicative of a water leak, as water leaks are generally accompanied by evaporative cooling that reduces a temperature of the structure surrounding the leak.

For example, each sensor 12 in FIG. 1 may be associated with a corresponding portion of the roof 14. For purposes of clarity, only a first portion 32 of the roof 14 and second portion 34 of the roof 14 are labeled in FIG. 1. The controller 16 may receive sensor feedback indicative of temperature, at a first moment in time, from the sensors 12 associated with the first portion 32 of the roof 14 and the second portion 34 of the roof 14. In some embodiments, the controller 16 may compare the temperature of the first portion 32 of the roof 14 with an expected temperature (e.g., reference temperature) of the first portion 32 of the roof 14. As will be described in detail below, the expected temperature (e.g., reference temperature) may be developed by the controller 16 during a baselining period of time in which the sensors 12 monitor the roof 14 while the roof 14 does not contain any defects. Local weather conditions, which may be obtained via an internet connection, may be taken into consideration by an algorithm running on the controller 16 when defining and comparing baselines. If the detected temperature of the first portion 32 of the roof 14 deviates from the expected temperature of the first portion 32 of the roof 14, taking into account relevant conditions (e.g., ambient temperature, humidity, wind conditions), the deviation may indicate a water leak. The controller 16 may conduct a similar analysis of the second portion 34 of the roof 14 to diagnose whether a water leak is present in the second portion 34 of the roof 14.

In some embodiments, the controller 16 may additionally or alternatively compare the detected temperature of the first portion 32 of the roof 14 with the detected temperature of the second portion 34 of the roof 14. In these embodiments, if the detected temperature of the first portion 32 of the roof 14 deviates from the temperature of the second portion 34 of the roof 14 by more than is expected, the deviation may indicate a water leak as noted above. However, it should be understood that temperature differences across various portions of the roof 14 may be expected based on elevation differences, shade, and other factors. Accordingly, as previously noted and as described in detail below, a baselining procedure that takes into account factors such as elevation differences, shade, weather events, daily or seasonal changes, and the like may be performed during a baselining period of time to develop expected temperatures and other parameters (e.g., light, sound, moisture, etc.). It should be noted that sensor measurements may be taken with respect to an exterior (e.g., outdoor-facing) and/or interior (interior-facing) portion of the roof, and the sensors may be positioned appropriately for such purposes.

Expected feedback (e.g., expected temperature or temperature differential) may be stored by the controller 16 (e.g., in the memory 20) or otherwise accessible be the controller 16 (e.g., from a database 35). In some embodiments, the database 35 may store information relating to a single roof or a plurality of roofs that employ the presently disclosed roof monitoring features. For example, when a roof defect is detected and/or diagnosed by the system 8 (e.g., via the controller 16), the roof defect detection and/or diagnosis may be subsequently confirmed or repudiated (e.g., via manual inspection). Confirmation or repudiation of the roof defect detection and/or diagnosis may be utilized to update the information (e.g., the expected feedback information) in the database 35. For example, if a roof defect detection and/or diagnosis is determined by the controller 16 based in part on the expected feedback stored to the database 35, but the roof defect detection and/or diagnosis is subsequently repudiated (e.g., determined to be inaccurate), then the expected feedback in the database 35 may be updated to reflect the repudiation (e.g., the expected feedback may be changed or removed). If the roof defect detection and/or diagnosis is determined by the controller 16 based in part on the expected feedback stored to the database 35, and the defect detection and/or diagnosis is later confirmed, then the expected feedback utilized by the controller 16 in said roof defect detection and/or diagnosis may be prioritized in subsequent iterations. In certain embodiments, the above-described updating of the expected feedback stored to the database 35 may be employed across a network of roofs, including the roof 14 in FIG. 1. In this way, expected feedback may be derived, in certain embodiments, from a plurality of roofs. That is, the expected feedback employed in detecting and/or diagnosing defects in the roof 14 of FIG. 1 may be based at least in part on analysis of other roofs.

Further, expected feedback may be determined at least in part via a baselining procedure of the system 8 with the roof 14. For example, the sensors 12 may be installed on the roof 14 at a time when it is known the roof 14 does not include defects. The controller 16 may receive sensor feedback from the sensors 12 while the roof is known to be without defect, and the data may be recorded to the memory 20, the database 35, or both. The recorded data may be utilized to develop expected sensor feedback associated with the various portions (e.g., portions 32 and 34) of the roof 14. The expected sensor feedback may be also determined, via the baselining procedure, for various environmental conditions, or alternatively the controller 16 may be capable of determining when obtrusive environmental conditions are present and roof monitoring is not possible. In general, the expected sensor feedback may be utilized after the baselining procedure to determine whether sensor feedback in real time indicates a deviation that might correspond to a roof defect. For example, in one embodiment, the baselining procedure may determine an expected temperature of the first portion 32 of the roof 14. If the detected temperature of the first portion 32 of the roof 14 substantially deviates from the expected temperature of the first portion 32 of the roof 14, then the controller 16 may determine a water leak is likely present.

As noted above, the baselining procedure may take into account seasonal and other expected changes associated with the environment surrounding the roof 14 of the building 10 while developing expected sensor readings. For example, the baselining procedure may develop a table having expected temperatures for various portions (e.g., first portion 32, second portion 34) of the roof 14 for various times of the day, for various times of the year, during various weather events (e.g., rain, wind, fire), during various ambient temperatures, and the like. After baselining is complete or otherwise substantially accurate, real time feedback may be compared against expected parameters to monitor whether a property (e.g., temperature) of the roof 14 deviates from the expected feedback associated with the present environmental conditions (e.g., season, weather, ambient temperature, etc.). Indeed, the controller 16 may be communicatively coupled to various environmental input sources 37 (e.g., sensors, weather broadcasting services, calendar, clock, etc.) that provide real-time data to the controller 16 indicative of the above-described environmental factors. Thus, the controller 16 can contextualize the data feedback received from the sensors 12 with the data received from the environmental input sources 37 during the baselining process and during roof monitoring (e.g., after the baselining process).

The above-described temperature data may be utilized to detect a roof defect and diagnose the roof defect as a water leak. For example, as previously described, water leaks may be generally caused or accompanied by evaporative cooling that results in a reduced temperature of the roof structure having the water leak. As previously described with respect to FIG. 2, other sensor data may be utilized to detect roof defects and diagnose the roof defects (e.g., as holes, roof drain blockages, ingress/egress of animals, etc.). For example, laser light sensors 42 (e.g., infrared receivers) and/or daylight sensors 44 may additionally or alternatively be included and utilized to detect roof defects and diagnose the roof defects as holes or roof drain blockages. If the laser light sensors 42 (e.g., infrared receivers) are employed, a laser light source 26 (e.g., infrared emitter) may also be employed. In the illustrated embodiment, the laser light source 26 is mounted on the roof 14. The laser light source 26 may be intermittently activated to direct laser light onto the roof 14. The sensors 12 of FIG. 1 (e.g., laser light sensors 42 in FIG. 2) may be configured to detect laser light reflecting off the roof 14. In some embodiments employing the laser light sensors 42 of FIG. 2, the laser light sensors 42 may be installed on or near the roof 14, but offset from a surface of the roof 14 in order to detect laser light reflected off the surface of the roof 14. If the laser light sensors 42 detect more laser light reflected away from the roof 14 than would otherwise be expected (e.g., where the expected readings are developed during a baselining procedure), the controller 16 may determine, based on the feedback received from the laser light sensors 42, that water is present on the roof 14 (e.g., at a roof joint) and reflecting light away from the roof 14. These conditions may be indicative of a blocked roof drain (e.g., blocked joint). Thus, the controller 16 may diagnose the roof defect as a blocked roof drain (e.g., blocked joint) based on feedback from the laser light sensors 42 in FIG. 2. Further, the laser light sensors 42 may not detect laser light would be detected based on expectations from baselining because the laser light is being deflected by a hole or warping in the roof 14. Thus, combinations of laser light detections, partial detections, and lack of expected detections may be assembled based on an analysis algorithm performed by the controller 16 to identify openings, warping, and other defects in the roof 14 (e.g., roofing material).

If the daylight sensors 44 of FIG. 2 are employed, the daylight sensors 44 may be configured to detect daylight (e.g., from the sun 28) passing through portions of the roof 14, which may indicate a hole in the roof 14. If the daylight passing through the portions of the roof 14 is more than is expected, then the controller 16 may determine a roof defect is present and diagnose the roof defect as a hole in the roof 14. Like the data associated with the temperature sensors 40 of FIG. 2, the data associated with the laser light sensors 42 and/or daylight sensors 44 of FIG. 2 may be compared against expected values, such as expected values developed during a baselining procedure conducted at a time when it is known that the roof 14 is not defective. Of course, expected values may be determined (e.g., via baselining) for various environmental conditions that may be present at any given time, as previously described. Thus, the controller 16 may receive data from the environmental input sources 37 illustrated in FIG. 1 and described above to determine whether relevant environmental conditions are present and impact the detected laser light or daylight sensor readings.

The system 8 of FIG. 1 may additionally or alternatively employ the sound sensors 46 of FIG. 2, which are configured to detect sound or vibration. The detected sound or vibration, if deviating from certain expected sounds or vibration, may indicate ingress or egress of animals through the roof 14. Like the sensor feedback associated with the temperature sensors 40, laser light sensors 42, and daylight sensors 44, the sensor feedback from the sound sensors 46 may be compared against expected sound determined for the roof 14 and by the controller 16 over a baselining period of time. In general, the sound sensors 46 may be utilized to detect sound indicative of ingress or egress of animals through the roof 14. However, in some embodiments, the sound sensors 46 may be employed to detect dripping or splashing of water. As previously described, environmental conditions may be taken into consideration when determining if the sound sensor feedback deviates from expected sound sensor feedback. The environmental conditions may include, for example, weather events and other sounds caused by conditions surrounding the roof 14, such as air conditioner sounds. It should be noted that feedback from multiple sensors may be utilized in conjunction with data related to locations of the sensors (e.g., sound sensors 46) to triangulate a location for a source of the detected event (e.g., detected sound).

The system 8 of FIG. 1 may additionally or alternatively employ moisture sensors 48 configured to detect moisture present on the roof 14. The detected moisture, if deviating from any expected moisture, may indicate a roof defect, such as a water leak. Similar to the aforementioned sensor data, the controller 16 may perform a baselining procedure (e.g., to determine expected moisture content on the roof 14), and may compare sensor feedback in real time against the expected moisture content to determine whether a roof defect is likely present. Additionally or alternatively, the controller 16 may consider data received from the environmental input sources 37 to determine the relevance of detected moisture. For example, in one embodiment, the controller 16 may detect, by way of data from the moisture sensors 48, the presence of moisture in a portion (e.g., the portion 32) of the roof 14. However, the controller 16 may only confirm the moisture content as indicating a roof defect if the controller 16 determines, based on data from the environmental input sources 37, that it is not currently raining and has not recently rained.

It should be noted that, in some embodiments, a first portion of the sensor feedback from the sensors 46 may be employed to detect the roof defect, and a second portion of the sensor feedback from the sensors 46 may be employed to diagnose a cause of the roof defect. For example, the a roof hole corresponding to the roof defect may be detected based on sensor feedback indicative of light passing through the roof 14, whereas a cause of the roof hole may be diagnosed based on sensor feedback indicative of another characteristic of the roof 14 (e.g., a cause of the roof hole may be diagnosed as a water leak based on sensor feedback indicative of roof temperature, or a cause of the roof hole may be diagnosed as animal ingress/egress based on sensor feedback indicative of sound or vibrations associated with the roof 14).

After detecting and diagnosing a roof defect with any of the above-described sensor feedback, the controller 16 may send a communication to a customer interface device (CID) 30 of the customer. The communication may include an indication that a roof defect is present, a diagnosis of the roof defect (e.g., water leak, roof hole, blocked roof drain or joint, ingress/egress of animals, etc.), and an indication of the portion (e.g., the first portion 32 in FIG. 1, the second portion 34 in FIG. 1) of the roof 14 in which the defect is present.

Figure 3:
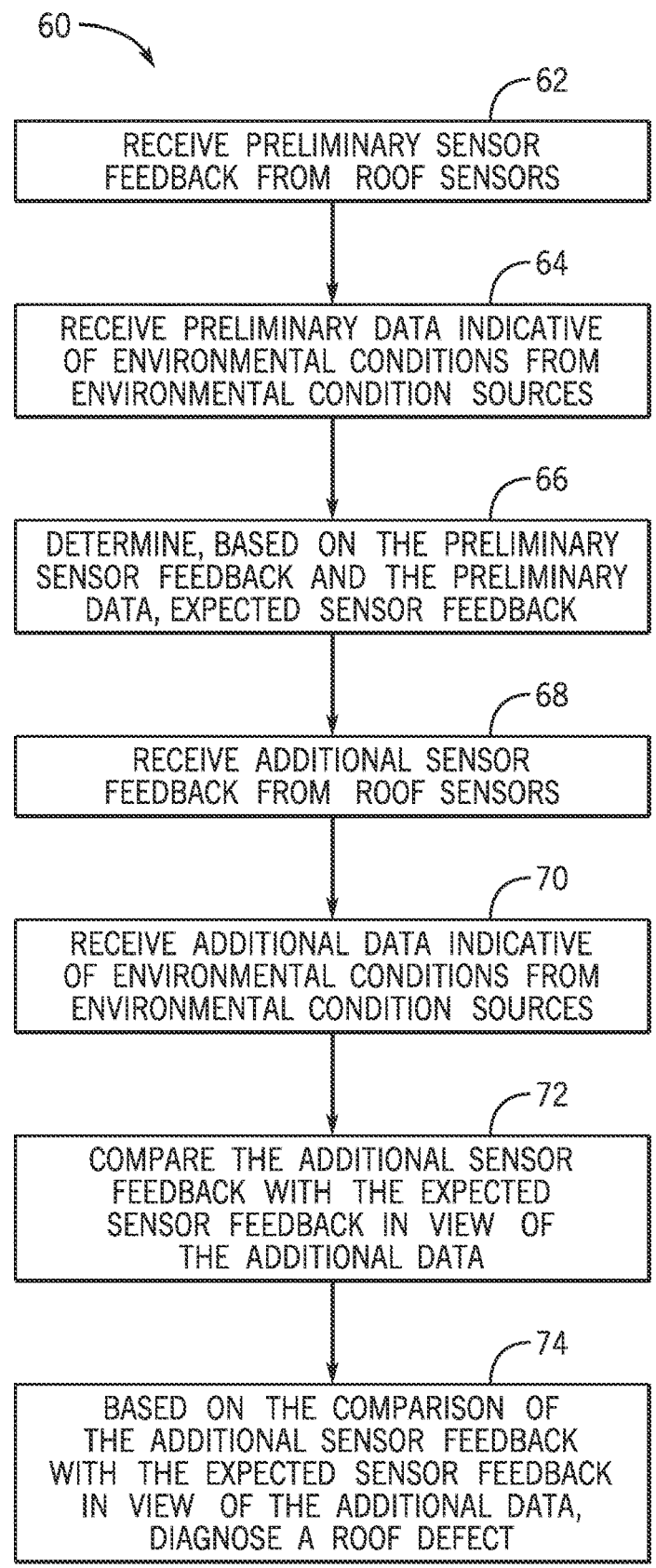
FIG. 3 illustrates a method of monitoring a roof of a building via the system of FIG. 1, in accordance with embodiments described herein.

FIG. 3 illustrates an embodiment of a method 60 of monitoring a roof of a building via the system of FIG. 1. In the illustrated embodiment, the method 60 includes receiving (block 62), at a controller, preliminary sensor feedback from various roof sensors, such as temperature sensors, laser light sensors, daylight sensors, sound or vibration sensors, and moisture sensors.

The method 60 also includes receiving (block 64), at the controller, preliminary data indicative of environmental conditions from environmental condition sources, which may include internet sources. The environmental conditions can include a wide range of conditions, such as ambient temperature, weather data or events (e.g., rain, hurricane, tornado, fire), humidity levels, time of day, time of year or season, etc. The environmental data sources may include, for example, sensors (e.g., other than the roof monitoring sensors 12 in FIG. 1) such as ambient temperature sensors and humidity sensors, weather broadcasting services, and certain other internet connected sources.

The method 60 also includes determining (block 66), via the controller and based on the preliminary sensor feedback in block 62 and the preliminary data in block 64, expected sensor feedback. That is, the controller may contextualize the preliminary sensor at block 62 with the preliminary data at block 64 to determine expected feedback. For example, the controller may develop various expected feedback (e.g., from the sensors 12 of FIG. 1) that depend on the above-described environmental conditions. Put differently, the controller may record expected feedback (e.g., from the sensors 12 of FIG. 1) with respect to various environmental conditions, such that later roof monitoring can take into account later environmental conditions that may affect parameters (e.g., temperature, light, sound, etc.) associated with the roof.

It should be noted that blocks 62, 64, 66 may be referred to as a baselining procedure of the method 60. In general, the baselining procedure may be conducted at a time when the roof is known or believed to be without defect. Thus, the sensor readings during the baselining procedure will not be biased by roof defects, and roof defects can be later detected via roof monitoring that compares real-time data against the data gathered in the baselining procedure. Thus, after the baselining procedure in blocks 62, 64, 66, the method 60 may include monitoring the roof for defects as described in detail below. It should be noted that the baselining may be performed multiple times (e.g., during various seasons, months, weekly, daily) and/or once. Baselining may be performed and the results used in predictive algorithms to create baselines for different conditions than those under which baselining actually occurred. For example, measurements from baselining on a summery day with certain weather conditions in a particular geographic region may be modified to represent baseline measurements for that geographic region on a winter day with different weather conditions.

The method 60 includes receiving (block 68), at the controller, additional sensor feedback from the roof sensors. For example, as previously described, the roof sensors may include one or more types of roof sensors, such as temperature sensors, laser light sensors, daylight sensors, sound or vibration sensors, or moisture sensors. In embodiments employing the laser light sensors (e.g., infrared sensors), a laser light source (e.g., infrared emitter) may also be employed as previously described. For example, a laser light source may be directed toward the roof, and the laser light sensors may be configured (e.g., positioned and oriented) to detect laser light reflecting off the roof (e.g., laser light reflecting off water collected on the roof). In embodiments employing daylight sensors, the daylight sensors may be configured (e.g., positioned and oriented) to detect daylight (i.e., from the sun) shining through a roof hole.

The method 60 also includes receiving (block 70), at the controller, additional data indicative of environmental conditions from the environmental condition sources. For example, as previously described, the environmental condition sources are configured to provide to the controller additional data indicative of real-time environmental conditions, such as ambient (e.g., atmospheric) temperature, weather events (e.g., rain, hurricane, tornado, fire), humidity levels, and the like. Thus, the environmental condition sources may include, for example, sensors such as ambient temperature sensors and humidity sensors, weather broadcasting services, and certain other Internet connected sources.

The method 60 also includes comparing (block 72), via the controller, the additional sensor feedback of block 68 with the expected sensor feedback of block 66 in view of the additional data of block 70. That is, the controller may determine whether any relevant environmental conditions are present, and then to determine whether the additional sensor feedback, in view of any relevant and present environmental conditions, deviates from the expected feedback developed by the controller during the baselining procedure described in blocks 62, 64, and 66. In some embodiments, the controller may determine whether the additional sensor feedback deviates from the expected sensor feedback by more than a threshold amount.

The method 60 also includes diagnosing (block 74) a roof defect based on the comparison at block 72. For example, as previously described, various types of sensor feedback may be indicative various types of roof defects. For example, temperature sensor feedback deviating from expected temperature sensor feedback (e.g., by more than a threshold amount) may indicate a water leak, as water leaks may be accompanied by evaporative cooling that reduces a temperature of the roof structure adjacent the water leak. Further, laser light sensor feedback deviating from expected laser light sensor feedback (e.g., by more than a threshold amount) may indicate a collection of water on the roof, which may be indicative of a roof drain or joint blockage. Further, daylight sensor feedback deviating from expected daylight sensor feedback (e.g., by more than a threshold amount) may indicate a roof hole through which daylight passes. Further still, sound or vibration sensor feedback deviating from expected sound or vibration sensor feedback (e.g., by more than a threshold amount) may indicate egress/ingress of animals, which may also indicate a hole in the roof. Further still, moisture sensor feedback deviating from expected moisture sensor feedback (e.g., by more than a threshold amount) may indicate a water leak. Block 74 may also include formulating a communication indicating the roof defect, diagnosing the roof defect, and indicating a location of the roof defect, where the control sends the communication to a customer interface device (CID) associated with the customer.

In accordance with present embodiments, any detected defect may be correlated to a risk value for further damage and/or a cost for damage repair. For example, a leak detection may be correlated to a risk of water damage. If a threshold number of leaks are detected or a substantially large leak is detected, a higher risk of water damage may be assessed. As another example, if a threshold amount of noise is detected, a risk value may be assigned in relation to a potential infestation. Further, dollar values may be assigned to such detections (including assessment of potential future damage and existing damage). For example, values associated with roof leaks may range from a value required to repair damage to a specific location on the roof (e.g., a limb falling on the roof), a value for complete roof repair due to substantial damage from hail, and/or water damage to home contents due to potential future leaks. To provide such estimates, present embodiments may include or provide access to databases that correlate detected issues with costs for remediation (e.g., costs for roof repairs, water cleanup, fumigation). Such values may be reported to a user in any of various formats, including recommendations or notifications related to adjustments to insurance rates. Timeframes may also be taken into account. For example, if substantial damage is detected, a first notice may go out to let the user know the perform an inspection and if sufficient time passes before a follow up is confirmed (e.g., via user confirmation or approved vendor confirmation being input into the system), present embodiments may alert the user to an increase in a price for insurance coverage (e.g., coverage related to water damage remediation).

Figure 4:
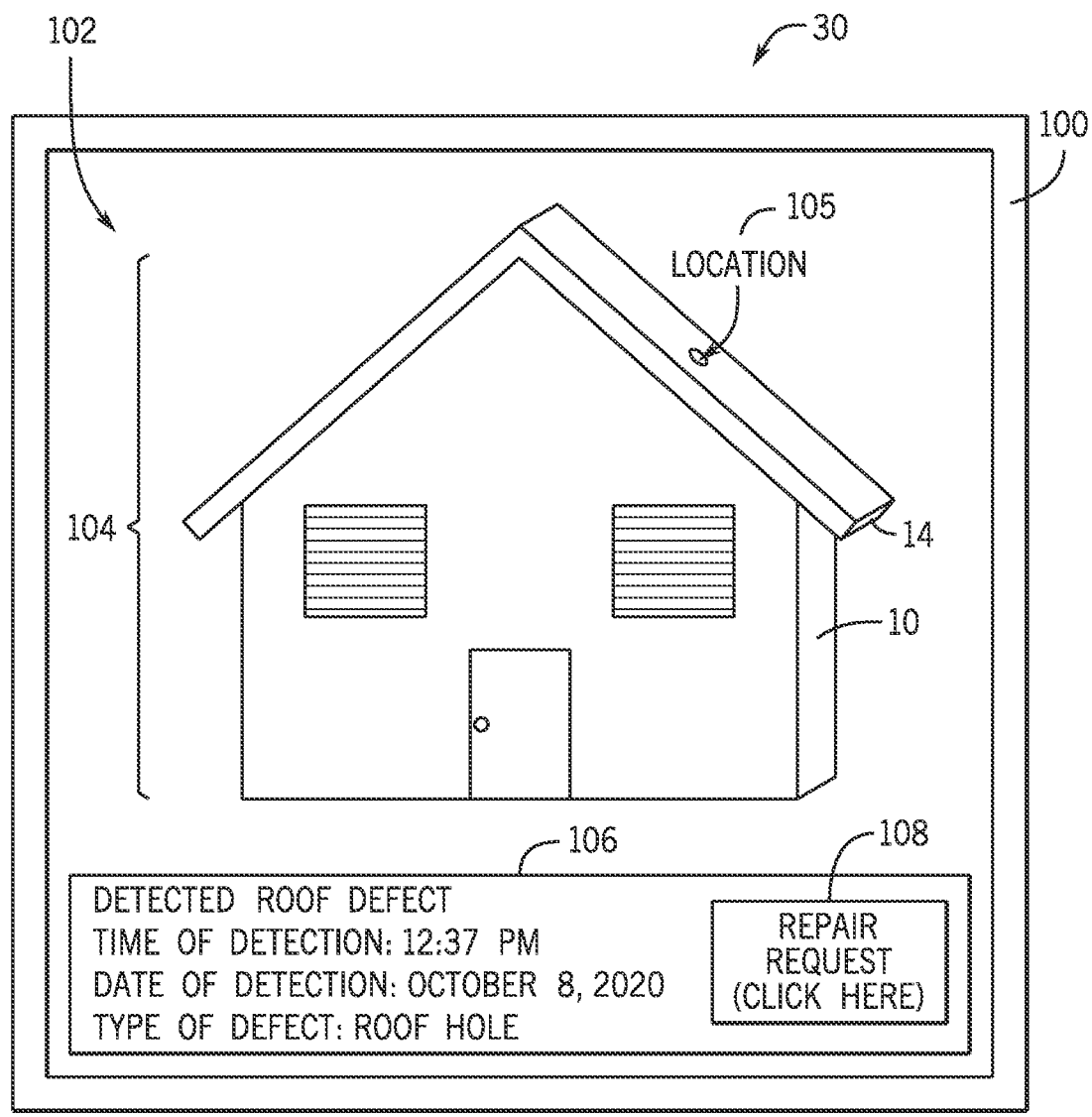
FIG. 4 illustrates a graphical user interface (GUI) presentable on a customer interface device (CID) and including a depiction of a roof defect diagnosis, in accordance with embodiments described therein.

FIG. 4 illustrates an embodiment of a graphical user interface (GUI) 102 presentable on a display 100 of the customer interface device (CID) 30 illustrated in FIG. 1. As previously described, the controller 16 of FIG. 1 may send a communication to the CID 30 in response to detecting and/or diagnosing a roof defect. In the embodiment illustrated in FIG. 4, the GUI 102 includes an illustration of the building 10, the roof 14 of the building 10, and an indication 105 of a location of the roof defect. The GUI 102 also includes a legend 106 with various information relating to the roof defect, such as a time of detection, a date of detection, and a type of defect. The legend 106 (or another area of the GUI 102) may also include an input option 108 (e.g., button) for requesting a repair in response to receiving the communication. Further, the GUI 102 may also provide information related to risk assessment and costs, such as that discussed above. For example, the GUI 102 may display calculated risk values, costs for repair, insurance adjustments, and the like.

Embodiments in accordance with the present disclosure enhance roof monitoring for detecting and diagnosing roof defects relative to traditional embodiments. In particular, presently disclosed embodiments improve an accuracy and speed of detecting and diagnosing roof defects over traditional embodiments.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A roof monitoring system, comprising:
a plurality of sensors configured to be distributed across a roof of a building; and
a controller configured to:
receive sensor feedback from the plurality of sensors, wherein the sensor feedback is indicative of a first characteristic of light reflected off the roof from an open environment above the roof, a second characteristic of light passing through the roof from the open environment above the roof, a third characteristic of sound associated with the roof, or any combination thereof;
compare the sensor feedback with an expected feedback;
detect, in response to determining that the sensor feedback deviates from the expected feedback, a roof defect; and
diagnose a cause of the roof defect.

2. The roof monitoring system of claim 1, wherein the controller is configured to:
receive preliminary sensor feedback from the plurality of sensors before receiving the sensor feedback from the plurality of sensors, wherein the preliminary sensor feedback is indicative of a preliminary first characteristic of light reflected off the roof from the open environment above the roof, a preliminary second characteristic of light passing through the roof from the open environment above the roof, a preliminary third characteristic of sound associated with the roof, or any combination thereof; and
determine, based on the preliminary sensor feedback, the expected feedback.

3. The roof monitoring system of claim 2, wherein the controller is configured to:
receive preliminary data indicative of environmental conditions surrounding the roof; and
determine, based on the preliminary sensor feedback and the preliminary data indicative of the environmental conditions surrounding the roof, the expected feedback, wherein the environmental conditions comprise a time of day, a time of year, a weather event, or a combination thereof.

4. The roof monitoring system of claim 1, wherein the controller is configured to identify the expected feedback by accessing a dynamic database, and wherein the controller is configured to update the dynamic database with a confirmation of the roof defect upon receiving an indication of the roof defect, the cause of the roof defect, or both.

5. The roof monitoring system of claim 1, wherein the controller is configured to diagnose the roof defect as a water leak, a roof hole, animal ingress/egress, or a roof drain or joint blockage based on one or more types of the sensor feedback that deviates from the expected feedback.

6. The roof monitoring system of claim 1, wherein the sensor feedback is indicative of at least two of the first characteristic of light reflected off the roof from the open environment above the roof, the second characteristic of light passing through the roof from the open environment above the roof, or the third characteristic of sound associated with the roof.

7. The roof monitoring system of claim 1, wherein the controller is configured to:
receive, as the sensor feedback from the plurality of sensors, a first portion of the sensor feedback indicative of the second characteristic of light passing through the roof from the open environment above the roof, and a second portion of the sensor feedback indicative of the third characteristic of sound associated with the roof;
detect, in response to determining that the first portion of the sensor feedback deviates from a first portion of the expected feedback, a roof hole corresponding to the roof defect; and
diagnose, in response to determining that the second portion of the sensor feedback deviates from a second portion of the expected feedback, the cause of the roof hole corresponding to the roof defect as animal ingress/egress.

8. The roof monitoring system of claim 1, comprising a laser light disposed in the open environment above the roof, wherein the plurality of sensors is configured to detect, in response to the laser light directing light through the open environment above the roof and toward the roof, the first characteristic of light reflected off the roof from the open environment above the roof, the second characteristic of light passing through the roof from the open environment above the roof, or both, and wherein the sensor feedback is indicative of the first characteristic of light reflected off the roof, the second characteristic of light passing through the roof from the open environment above the roof, or both.

9. The roof monitoring system of claim 1, wherein the plurality of sensors is configured to be exposed to the open environment above the roof.

10. The roof monitoring system of claim 1, wherein the sensor feedback is indicative of at least the second characteristic of light passing through the roof defect in the roof from the open environment above the roof.

11. The roof monitoring system of claim 1, wherein the plurality of sensors comprises at least one daylight sensor.

12. The roof monitoring system of claim 1, wherein the sensor feedback is indicative of at least the third characteristic of sound associated with the roof.

13. A computer-implemented method, comprising:
detecting, via a sensor assembly, a characteristic associated with a roof;
receiving, at a controller and from the sensor assembly, sensor feedback indicative of the characteristic associated with the roof;
determining, via the controller and based on the sensor feedback, that the characteristic associated with the roof deviates from a reference characteristic associated with the roof;
determining, via the controller, a roof defect of the roof in response to determining that the characteristic associated with the roof deviates from the reference characteristic associated with the roof, and
diagnosing, via the controller, a cause of the roof defect as a roof drain or joint blockage in response to determining that a light characteristic of light reflected from the roof deviates from an expected light characteristic of light reflected from the roof, wherein the light characteristic corresponds to the characteristic associated with the roof, and wherein the expected light characteristic corresponds to the reference characteristic associated with the roof.

14. The computer-implemented method of claim 13, comprising:
determining, via the controller, environmental conditions associated with the roof; and
selecting, via the controller and based on the environmental conditions, the reference characteristic associated with the roof from a plurality of reference characteristics associated with the roof.

15. The computer-implemented method of claim 14, comprising determining, via the controller and as at least a portion of the environmental conditions associated with the roof, a time of day, a time of year, and an ambient temperature.

16. The computer-implemented method of claim 13, comprising:
detecting, via the sensor assembly, a preliminary characteristic associated with the roof when the roof is not defective;
receiving, at the controller and from the sensor assembly, preliminary sensor feedback indicative of the preliminary characteristic associated with the roof, and
storing, based on the preliminary sensor feedback, the preliminary characteristic associated with the roof as the reference characteristic associated with the roof.

17. The computer-implemented method of claim 13, comprising diagnosing, via the controller, an additional cause of an additional roof defect of the roof as a water leak in response to determining that a roof temperature associated with the roof deviates from an expected roof temperature associated with the roof.

18. The computer-implemented method of claim 13, comprising diagnosing, via the controller, an additional cause of an additional roof defect of the roof as a roof hole in response to determining that an additional light characteristic of light passing through the roof deviates from an expected additional light characteristic of light passing through the roof.

19. The computer-implemented method of claim 13, comprising diagnosing, via the controller, an additional cause of an additional roof defect of the roof as animal ingress/egress in response to determining that a sound characteristic of sound associated with the roof deviates from an expected sound characteristic of sound associated with the roof.

20. One or more non-transitory, computer-readable media comprising instructions stored thereon that, when executed by one or more processors, are configured to cause the one or more processors to:
receive, from a sensor assembly, sensor feedback indicative of a roof temperature differential, wherein the roof temperature differential is based on a first roof temperature of a first portion of the roof and a second roof temperature of a second portion of the roof;
compare, based on the sensor feedback, the roof temperature differential with an expected roof temperature differential, wherein the expected roof temperature differential is based on a first expected roof temperature of the first portion of the roof and a second expected roof temperature of the second portion of the roof;
determine, based on the roof temperature differential deviating from the expected roof temperature differential, a presence of a defect of the roof; and
diagnose a cause of the defect of the roof as a water leak in the roof.

* * * * *